United States Patent [19]
Whitehead et al.

[11] Patent Number: 4,945,727
[45] Date of Patent: Aug. 7, 1990

[54] HYDRAULIC SHAPE MEMORY ALLOY ACTUATOR

[76] Inventors: Charles A. Whitehead, 3508 S. Woodridge Rd., Birmingham, Ala. 36330; Kenneth M. Groom, 119 Hillcrest Loop, Enterprise, Ala. 36330

[21] Appl. No.: 448,250
[22] Filed: Dec. 11, 1989
[51] Int. Cl.$^5$ .................................................. F03G 7/06
[52] U.S. Cl. ............................................ 60/527; 60/528
[58] Field of Search ........................... 60/527, 528, 529

[56] References Cited

U.S. PATENT DOCUMENTS 4,222,239  9/1980  Negishi .................................. 60/527
4,586,335  5/1986  Hosada et al. ...................... 60/527 X Primary Examiner—Allen M. Ostrager
Attorney, Agent, or Firm—Hurt, Richardson, Garner, Todd & Cadenhead

[57] ABSTRACT

A hydraulic shape memory alloy actuator is provided comprising a uniaxial shape memory alloy wire constructed of Nitinol. The actuator utilizes a pair of hydraulic cylinders in fluid communication with each other, each cylinder containing a hydraulic piston. The first hydraulic piston is moved from a first position to a second position when the wire, connected at one end to the piston and its other to a fixed point, changes from a martensitic to an austenitic state upon heating. The second hydraulic piston responds to the movement of the first hydraulic piston by moving from a rest position to an operating position. Upon cooling the wire to change it from the austenitic state back to the martensitic state, the first piston returns to its original position, with a biasing means being provided to return the second piston to its rest position.

27 Claims, 2 Drawing Sheets

HYDRAULIC SHAPE MEMORY ALLOY ACTUATOR

BACKGROUND OF THE INVENTION

The present invention relates to an actuator utilizing a shape memory alloy in conjunction with hydraulic force conversion.

Shape memory alloys have been known and available for many years and have been proposed as operative elements in various types of devices. Because of their dramatic strength and response to temperature, shape memory alloys have been proposed as alternatives to motors, solenoids, expandable wax actuators, and bimetallic temperature sensitive actuators. Although not a panacea, a shape memory alloy approach to electromechanical actuation may offer advantages which conventional approaches would find difficult or impossible. For example, large amounts of recoverable strain available from shape memory alloys offer work densities many times higher than conventional approaches. Also, the high electrical resistivity of shape memory alloys permits direct electrical actuation without extra parts and with efficient use of available energy.

Generally, the shape memory alloy is a nickel-titanium alloy called Nitinol or Tinel, although copper-based alloys have been used in many similar applications. Early investigations on Nitinol started in 1958 by the U.S. Naval Ordinance Laboratory which uncovered a new class of novel nickel-titanium alloys based on the ductile intermetallic compound TiNi. These alloys were subsequently given the name Nitinol which is disclosed in U.S Pat. No. 3,174,851 of Mar. 23, 1965 entitled "Nickel-Based Alloys," U.S. Pat. No. 3,351,463 of Nov. 7, 1967 entitled "High Strength Nickel-Based Alloys" and U.S. Pat. No. 3,403,238 of Sept. 24, 1968 entitled "Conversion of Heat Energy to Mechanical Energy," all patents being assigned to the United States of America as represented by the Secretary of the Navy.

The great interest in the near stoichiometric TiNi composition alloys stems from their unusual mechanical memory. This thermal-mechanical shape memory, or shape memory effect, allows a shape memory alloy like Nitinol to return to a preset shape after mechanical distortion. If the shape memory alloy is given a first shape or configuration and subjected to an appropriate treatment, and thereafter its shape or configuration is deformed, it will retain that deformed shape or configuration until such time as it is subjected to a predetermined elevated temperature. When it is subjected to the predetermined elevated temperature, it tends to return to its original shape or configuration. Heating above the predetermined elevated temperature is the only energy input needed to induce high-stress recovery to the original pre-deformation shape. The predetermined elevated temperature is usually referred to as the transition or transformation temperature. The transition or transformation temperature may be a temperature range and is commonly known as the transition temperature range (TTR).

As is well known, a shape memory alloy has two states, separated only by temperature. When cooled, the shape memory alloy is in the martensitic state, in which the alloy is relatively soft and easily deformed. When warmed above the TTR, the shape memory alloy is transformed into the austenitic state in which the alloy is much stronger and stiffer than when in the martensitic state. When in the martensitic state, the alloy may be deformed or changed in configuration from a preset configuration while under relatively low load. When the alloy is heated through its TTR, the alloy remembers its original preset shape and tends to return to that shape. In the process, it builds up forces that oppose the deformation occurring in the martensitic state, and the alloy can perform work while returning to its original shape.

Shape metal alloys have previously been used for actuator-type devices, often using elongated wire-shaped lengths of the alloy in tension (straight sections of wire) or in a combination of torsion, tension, and compression (helical coils of wire). The shape metal alloy wire is deformed while cool. When activation is required, the wire is heated to a temperature above the TTR, usually by passing an electric current through it. High electrical resistivity (similar to nichrome) of the shape metal alloy wire allows such an electrical current to impart energy into the wire, in the form of heat, equally along the length of the wire.

A metallurgical phenomenon which enables Nitinol alloys to have "shape memory" has been proposed, although the exact mechanism of energy exchange within the shape memory alloy is still in debate. The high temperature phase of the Nitinol is a body-centered-cubic crystal structure, usually referred to as an austenite. The low temperature phase of Nitinol is a twinned martensite which is represented by slightly shifting alternate rows of atoms away from the perpendicular registry of the higher temperature austenite phase. If the Nitinol in the twinned martensitic state is allowed to warm through its transition temperature range (TTR), it must return to the austenitic state. Since the state change is diffusionless, the transformation of Nitinol from the martensitic to the austenitic structure occurs very rapidly over a narrow temperature range. When a Nitinol specimen is cooled, it transforms from its austenitic state to a twinned martensitic state. However, the specimen can be easily deformed by the application of a stress, which eliminates the martensitic twin. The applied stress shifts the alternating atomic registry of the twinned martensitic structure to a parallel registry. The deformation of the twinned martensitic specimen, resulting in the atoms slipping to a new parallel position, is a deformation which will be recovered upon heating. Unlike all other heat-exchange systems, Nitinol responds to temperature changes in an unbalanced way, in that the force needed to bend it when it is cold is much less than the force it releases when it returns.

The narrow transition temperature range (TTR) over which the shape memory alloy recovers its shape is primarily a function of the alloy's composition, which is typically about 53% to about 57% Ni balance Ti. A third, interstitial element, such as cobalt, may also be added to the alloy to control the TTR temperature. A direct atom-for-atom substitution of cobalt for nickel is usually performed to progressively lower the TTR. The TTR at which the "shape memory effect" (SME) occurs may be set anywhere from $-200°$ C. (Liquid Nitrogen) to $150°$ C. with great accuracy ($\pm 1°$ C.). For example, the TTR may be varied rather precisely as follows: a 1.0% change of the Ni/Ti ratio results in a $150°$ C. change in the TTR or 70 ppm NiTi per $1°$ C. It should also be noted that recoverable straining must be performed below the TTR of the shape memory alloy.

The shape memory effect covers three principal plastic deformation modes. These are (1) uniaxial tension, (2) torsion or twisting, and (3) bending (combined torsion and compression stretching). Compression, while a very useful mode, was not considered in the present invention because of the difficulty and complexity associated with its stressing and straining. However, the mode which utilizes the shape memory effect best volumetrically is the uniaxial tension mode, because the entire cross-section of the specimen is used for the shape memory effect. In fact, the highest recovery forces presently produced are induced under uniaxial tension with a 20-mil (0.020-inch) diameter wire.

Another unusual important property of Nitinol alloys is the amount of deformation or strain that can actually be recovered. If the desired motion or force is desired only once during the life of the alloy, large deformations or strains, such as 8% to 20%, can be utilized. If the desired motion or force requires repeated cycling during the lifetime of the alloy, it is important that the straining not exceed a critical lever, usually 6% to 8%, to insure recoverable plastic straining. Straining beyond this limit will result in incomplete shape recovery of the shape memory alloy. Accompanying the shape recovery is a large energy conversion (heat to mechanical) which is capable of overtly exerting a large force or recovery stress. Values of recovery stress in excess of 110,000 psi have been reported for a 20-mil wire during uniaxial plastic straining of 6% to 8%. This recovery force is proportional to the initial strain, and higher temperatures are required to maintain maximum recovery stress in those specimens given higher initial strain. Also, as in the case of recovery stress, there is an optimum strain to obtain maximum work output. Values of maximum work output in excess of 2600 in-lbf/in$^3$ have been reported for a 20-mil wire during uniaxial plastic straining of 6% to 8%. Overall, the shape recovery produces high stress and work output.

Nitinol also has high electrical resistivity (approximately 76 microhm-cm), similar to nichrome; thus, it permits direct electrical shape memory actuation via resistance heating. Such heating results in an efficient work output as well as efficient use of energy input. Furthermore, the resistance will change slightly with temperature, depending on whether the temperature is rising or falling (heating or cooling). This change is dependent on specimen temperature and specimen memory state. Thus, the alloy will also lend itself to resistive feedback monitoring.

Some other interesting properties and characteristics of Nitinol should be mentioned. First, the cycle life of Nitinol has been reported as approaching infinite ($2.5 \times 10^7$ cycles) when strained below the recoverable strain limit (6% to 8%), limited only by the extent of testing performed to date. Second, Nitinol can develop a secondary shape memory. A "2-way" shape memory can be programmed into Nitinol specimens by appropriately repeating stress and/or thermal cycling. Once this conditioning has been achieved, a specimen will spontaneously revert to a shape when cooled, as well return to the initial memory state when heated. Finally, Nitinol is virtually non-magnetic, and practically inert to harsh corrosive environments, due to its elemental makeup. This allows Nitinol to be used in a wide variety of industrial and corrosive environments.

Previous research and development of the Nitinol has clearly indicated the potential for actuator-type devices. Such criteria as uniformly reliable strain-heat-recovery, accurate composition-related recovery range, high force and work output, electrical controllability of recovery, extremely high fatigue life, corrosion resistance, and non-magnetic nature are desirable criteria for prime movers in electrical actuation devices.

Repeatability is normally required in actuator applications. In this respect, it is desirable that the Nitinol part return to its deformed shape upon cooling (after the heating which changes the deformed shape to the memory shape), so that it can revert to its memory shape again in successive cycles. Since the yield strength of Nitinol is low at temperatures below the TTR, reversibility can be effected by biasing the Nitinol element with a common spring. When Nitinol is heated, it exerts more than a sufficient force to overcome the spring completely and perform the desired shape memory operation. On the other hand, as soon as the Nitinol part cools through its TTR, the spring is now strong enough to force the Nitinol back into the deformed shape. In this way, the Nitinol is ready to operate on the next heating cycle.

As stated previously, reversibility can be "built into" shape memory alloys, so that the use of the biasing spring or similar devices is not necessary. Once this reversibility has appropriately been conditioned into the alloy, the specimen will spontaneously revert to a shape when cold, without external biasing means.

Previous applications of shape memory alloys have included actuators in relays such as according to Jost (U.S. Pat. No. 3,968,380), Hickling (U.S. Pat. No. 3,849,756), and Clarke (U.S. Pat. No. 3,872,415); in temperature-sensing actuators as described by Melton (U.S. Pat. No. 4,205,293) and DuRocher (U.S. Pat. No. 3,707,694); in rotary actuators such as Block (U S. Pat. No. 4,761,955); in electro-mechanical drive actuators such as Suzuki (U.S. Pat. No. 4,736,587); in valve actuators such as Wilson (U.S. Pat. No. 3,613,732); and the like. Many of these shape memory alloy actuators have used inefficient Nitinol springs and bent Nitinol wires as the prime mover of the actuating device and not the more efficient uniaxial Nitinol wires. The use of Nitinol springs in a shape memory alloy actuator does not allow for the maximum work/volume or work/weight ratio of an actuator device. Therefore, there is a need for an actuator that utilizes the more efficient uniaxial shape memory alloy wire as an actuating element.

A problem occurs, however, in the use of the more efficient uniaxial shape memory alloy wires in that the uniaxial tension of the wire is constrained to a maximum 8% strain elongation for optimal shape recovery. The attainable 8% strain elongation of the uniaxial shape memory alloy wires, although providing a sufficient actuating force output over the 8% strain elongation, becomes a severe limitation to a shape memory alloy actuator design. Any application of an actuator requiring a larger movement and lower force is thereby severely limited with the use of uniaxial shape memory alloy wires. Therefore, there is a need for a shape memory alloy actuator utilizing a force conversion apparatus that is able to convert the high force output and small movement of a uniaxial shape memory alloy wire actuating element to a lower force and larger movement actuator output.

Although many types of force conversion apparatus are known, a desirable shape memory alloy actuator would need to employ a force conversion apparatus that is simple, lightweight, compact and easily made. In addition, since many actuators are used in repeating-type functions, the force conversion apparatus must be capable of rapid response and rapid cycling. Therefore, there is also a need for a shape memory alloy actuator utilizing a force conversion apparatus that is simple, lightweight, compact, easily made, and capable of rapid response and cycling.

As a shape memory alloy actuator would often be used in industrial applications, the actuator should be capable of withstanding a harsh environment and be relatively easy to maintain. Therefore, there also exists a need for a shape memory alloy actuator that is rugged and requires little maintenance in operation.

In many applications, it is desirable to control the force output of a shape memory alloy actuator. An actuator having a precisely controllable force output adaptive to many applications would be desirable. Therefore, there exists still a further need for a shape memory alloy actuator whose actuating force output is controllable.

Further, many times a shape memory alloy actuator will be used in an environment where electrical current is readily available for providing energy for operating and controlling electro-mechanical devices. A shape memory alloy actuator capable of using electric current control for its operation would be desirable for use in such a commonly found environment. Therefore, there exists still a further need for a shape memory alloy actuator which is capable of being operated and controlled by an electric current.

SUMMARY OF THE INVENTION

The present invention is directed to providing a hydraulic shape memory alloy actuator which contains a shape memory alloy actuating element utilized in conjunction with hydraulic force conversion. The actuator of the present invention uses a uniaxial shape memory alloy wire, such as a Nitinol wire, as an actuating element. The hydraulic shape memory alloy actuator has a pair of hydraulic cylinders, each containing a hydraulic piston. The first piston is moved from a first position by the action of the shape memory alloy actuating element which is actuated by passing an electric current through it which heats it. The second hydraulic piston responds through hydraulic fluid in communication with both cylinders to the movement of the first hydraulic piston to perform work, thereby allowing the high force output and small movement of the shape memory alloy actuating wire to be converted to a lower force and larger movement actuator output. Cooling of the actuator element allows the first piston to return to its first position, the second piston being biased to move back to its rest position.

In the first embodiment of the present invention, the two cylinders are concentrically mounted; while in the second embodiment, the second cylinder is external of the first cylinder but still in fluid communication with the first cylinder.

The hydraulic force conversion apparatus utilized in the actuator of the present invention is simple, lightweight, compact, and easily made. The conversion apparatus is also capable of rapid response and cycling. The apparatus, like the shape memory alloy actuator element itself, is rugged and requires little maintenance of operation. The actuator of the present invention may also be configured in a way such that its force output is controllable based on the number of shape memory alloy actuator elements contained in the actuator, the method utilized in selectively heating the elements, or the amount of electric current passed through the elements causing their heating. In addition, the shape memory alloy actuator elements are capable of providing resistive feedback during heating and cooling, thus allowing for precise heating and cooling of the elements in feedback-dependent temperature control circuits.

It is, therefore, an object of the present invention to provide an actuator which utilizes the more efficient uniaxial shape memory alloy wire as an actuating element.

It is also an object of the present invention to provide an actuator which is able to convert the high force output and small movement of a uniaxial shape memory alloy wire actuating element to a lower force and larger movement actuator output.

It is a further object of the present invention to provide an actuator utilizing a force conversion apparatus that is simple, lightweight, compact, easily made and capable of rapid response and cycling.

It is another object of the present invention to provide an actuator which is rugged and requires little maintenance in its operation.

It is yet another object of the present invention to provide an actuator whose actuating force output is controllable.

It is still further an object of the present invention to provide an actuator which is capable of being operated and controlled by an electric current.

DETAILED DESCRIPTION OF THE PREFERRED EMBODIMENTS

A. FIRST EMBODIMENT

Figure 1:
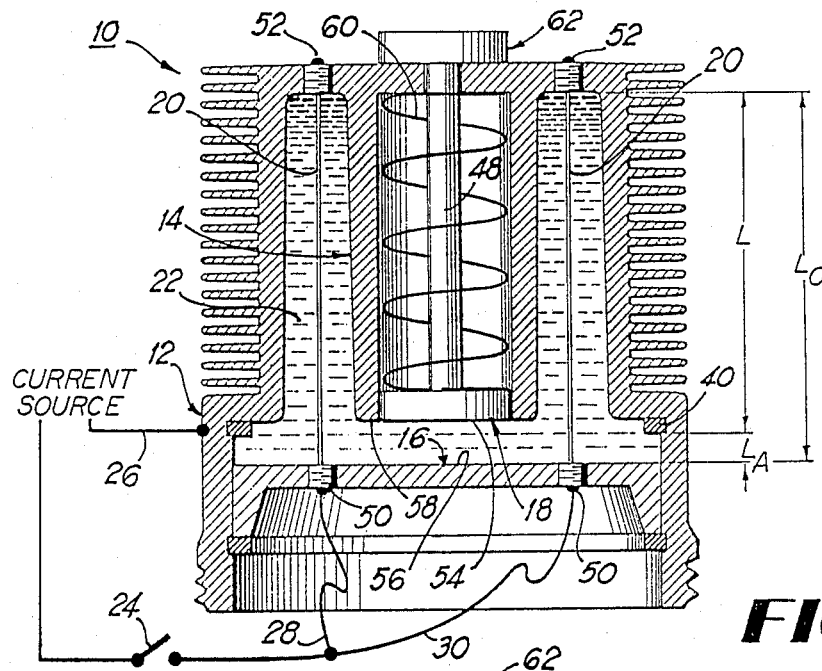
FIG. 1 is a cross-sectional view of the actuator of the present invention before actuation.
Figure 2:
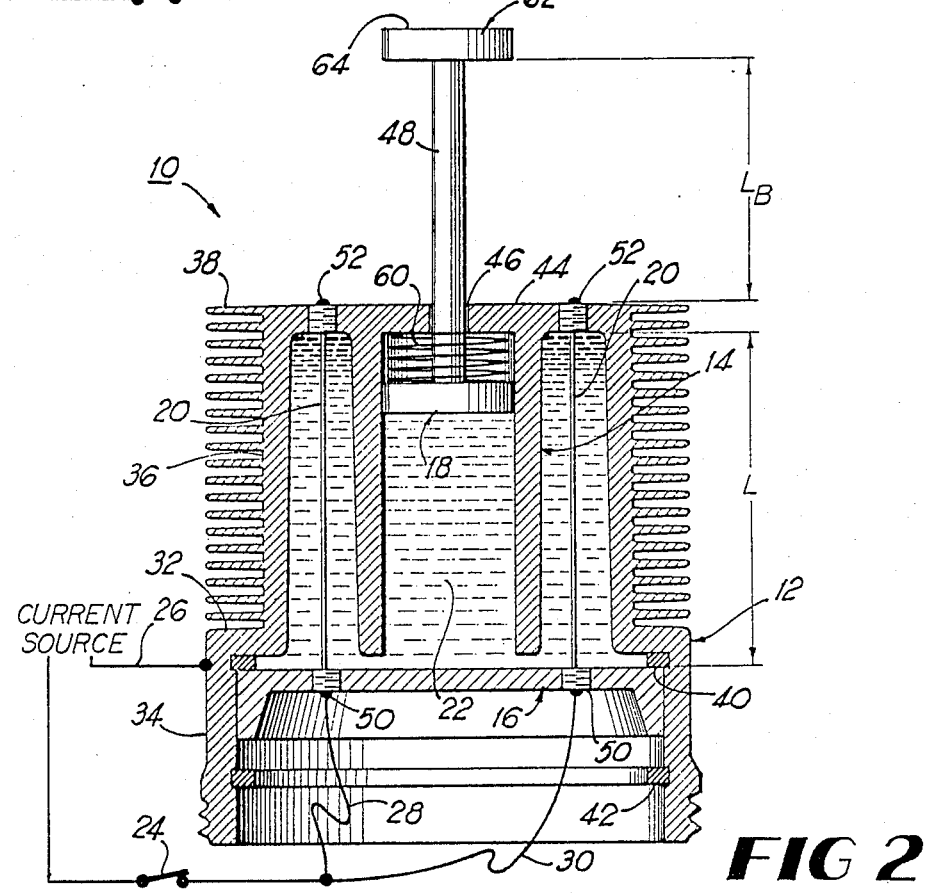
FIG. 2 is a cross-sectional view of the actuator shown in FIG. 1 when the actuator is an actuated state.

Turning now to the drawings in which like numerals represent like components throughout the several figures, the hydraulic shape memory alloy actuator of the first embodiment of the present invention is shown generally at 10, FIG. 1 disclosing the actuator 10 before actuation, while FIG. 2 illustrating the actuator 10 in an actuated or operative state. The actuator 10 comprises a first hydraulic cylinder 12 having mounted coaxially within it a second hydraulic cylinder 14. The first hydraulic cylinder 12 has a first piston 16 capable of movement therein between first and second positions, while the second hydraulic cylinder 14 has a second piston 18 movable between rest and operating positions. A pair of lengths of shape memory alloy wire 20 is located within the first hydraulic cylinder 12, each wire 20 in a diametrically opposed relationship to the other about the second cylinder 14 and attached at a first end to the first piston 16 and at a second end to the top 44 of the first hydraulic cylinder 12. In this manner, the second end of each wire 20 is connected to a fixed point disposed within the first cylinder 12. The second end of each wire 20 may alternatively be attached to other points that are fixed in position relative to the first cylinder 12. A fluid 22 is dispersed between the first piston 16 and the second piston 18, and can be found within the interior of the first hydraulic cylinder 12 and second hydraulic cylinder 14. The term "hydraulic" as used herein refers to the movement and force of a fluid, that fluid being either a liquid or gas. An electric current source is provided which is controlled by a switch 24 to provide current through connecting lines 26,28,30 so as to electrically heat the wires 20.

As shown in FIGS. 1 and 2, the first hydraulic cylinder 12 has an annular flange 32 connecting an upper cylinder section 36 with a lower cylinder section 34. The upper cylinder section 36 is of a reduced bore diameter than lower section 34. The two section cylinder design of the present invention maintains an overall compact actuator design and allows for a uniform cylinder wall thickness. For example, the compact configuration of the actuator 10 shown in FIGS. 1 and 2 allows for the attachment of spaced cooling fins 38 (which may be radially disposed, as shown, or may be in a vertical position) on the outside of the upper cylinder section 36 that do not protrude beyond the exterior of the lower cylinder section 34. Alternatively, the first hydraulic cylinder 12 may have a fixed bore diameter throughout its length.

The cooling fins 38 may be located on the outside of the upper cylinder section 36 or on the inside surface of first hydraulic cylinder 12 to promote dissipation of the heat from the wires 20. The cooling fins 38 provide a means for cooling the wires 20 and shorten the time required for the wires 20 to change from their austenitic state back to their martensitic state. Other cooling means are possible, such as a thermoelectric heating exchange unit attached to the outside of the first hydraulic cylinder 12. Alternately, cooling may be accomplished through convection transfer by moving a heat-exchange medium, such as a cooling fluid, around the actuator 10 or wires 120.

The first hydraulic cylinder 12 contains piston stops 40 and 42 along its inside bore for limiting the up and down movement of the first piston 16, respectively. Piston stop 40 is located adjacent flange 32. The piston stops 40,42 are preferably of the circlip type, having corresponding circlip grooves present in the inside bore of the first hydraulic cylinder 12 to accommodate them. The piston stops 40,42 must be made of a rigid material, such as steel, so as to accurately limit the movement of the first piston 16.

The first hydraulic cylinder 12 has a top 44 with a central opening 46 therethrough to allow passage of piston rod 48 which interconnects piston 18 with circular member 62. The opening 46 is of such dimensions so as to allow the passage of air around the rod 48 when it moves within the opening 46. If necessary, additional channels may be placed through the cylinder top 44 to allow for the escape of unwanted air in the second hydraulic cylinder 14 below.

Imbedded within the first hydraulic cylinder top 44, and in an opposed relationship to the piston 16, are a pair of threaded fasteners 52 which provide a secure mechanical connection point for the attachment of the ends of each wires 20. The threaded fasteners 52 are typically made of an electrically conducting metal so as to provide an electrical connection between the wall of first hydraulic cylinder 12 and the wires 20. Since the threaded fasteners 52 maintain good electrical contact between the wires 20 and the first hydraulic cylinder 12, the connecting line 26 is attached directly to the outer wall of the first hydraulic cylinder 12 to provide an electric current path. The threaded fasteners 50 embedded in the piston 16 are connected to lines 28 and 30, respectively. The threaded fasteners 50 in the piston 16 are made of an electrically conducting metal and are electrically insulated from each other by the electrically non-conducting first piston 16. Alternatively, threaded fasteners 50 may be used that are capable of insulating the wires 20 from the surrounding piston material when the first piston 16 is made of an electrically conducting material. The threaded fasteners 52 imbedded within the cylinder top 44 may alternatively comprise the type of fastener in which the attached wire 20 is electrically insulated from the surrounding cylinder wall. For example, a non-conducting ceramic threaded fastener may be used. In that case, the connecting line 26 would be directly attached to the threaded fasteners 52 of the cylinder top section 44. The wires 20 are usually attached to the threaded fasteners 50,52 by a brazing or welding process which does not degrade or detrimentally effect the wires 20.

The first hydraulic cylinder 12 and second hydraulic cylinder 14 are made of a non-porous, rigid material capable of containing the fluid 22, such as steel, cast iron, or a ceramic material. A non-porous, rigid and lightweight material such as aluminum or plastic polymer, may be used for constructing a lightweight actuator. The cylinders 12,14 are machined using machining methods well-known in the art and require no unusual finishing. The cylinders 12,14 could also be formed from a one-piece cast unit. The length of the second cylinder 14 is such that its bottom surface 58 terminates at the juncture of upper section 36 and lower section 34 to allow the fluid 22 to enter the cylinder 14.

As shown in FIGS. 1 and 2, the pistons 16,18 are rigid pistons. The first piston 16 has an upper fluid contacting surface 56 which is in contact with the fluid 22 dispersed between the first piston 16 and second piston 18. Likewise, the second piston 18 has, on its lower side, a fluid contacting surface 54 which is in contact with the fluid 22. The first piston 16 and second piston 18 shown are made of rigid materials that are capable of withstanding the forces generated in the actuator 10. Materials that are commonly used as rigid piston materials include, but are not limited to, metals and polymers. As shown, the first piston 16 is a rigid electrically non-conductive piston, preferably made from a plastic polymer. When rigid pistons are used, "O-rings" or other piston rings may be utilized, as is well-known in the art.

Alternatively, the first 16 and second 18 pistons may be non-rigid in construction. For example, a non-rigid piston may comprise a metal bellows, an elastometric diaphragm, or an expandable bladder. Therefore, the term "piston" as used herein, shall be understood to mean either a rigid or non-rigid piston. When the first piston 16 is a non-rigid piston, such as an elastometric diaphragm-type piston, the piston stops 40,42 may not be required, provided that the movement of the first piston 16 is limited to prevent wire 20 overstraining. The movement of a non-rigid first piston 16 may be self-limited due to the nature of the construction of the piston 16 itself, or may require additional elements. Elements utilized to prevent wire 20 overstraining due to excessive first piston 16 movement include, but are not limited to, mechanical stops well-known in the art, such as metal brackets or spacers.

The first piston 16 may also contain a means for preventing fluid pressure overload in the first hydraulic cylinder 12 by the use of a fluid accumulator (not shown) on the first piston 16. A typical fluid accumulator might comprise a spring-loaded bellows arrangement which would be biased to overload pressures.

The wire 20 is formed from a shape memory alloy of the types well-known in the art. These alloys include nickel-titanium alloys, copper-based alloys, nickel-titanium-copper alloys, and other alloys exhibiting a thermal-mechanical shape memory. Although the shape memory effect process occurs in a number of principal plastic deformation modes, the mode which utilizes the shape memory effective best volumetrically is the uniaxial tension mode, because the entire cross-section of the alloy is used for the shape memory effect. In fact, the highest recovery forces presently produced are induced under uniaxial tension with a 20-mil (0.020-inch) diameter wire. For these reasons, the wire 20 of the present invention was chosen to be a 20-mil (0.020-inch) diameter wire of shape memory alloy. For the reasons stated above, Nitinol, a nickel-titanium alloy, was selected as the shape memory alloy for the wires 20 of the present invention, although other shape memory alloys having similar properties could certainly have been used. Further, although a linear section of Nitinol is preferably used for the wires 20, other Nitinol wire configurations can be used, such as a coil-shaped wire.

The actuator 10 of the present invention is configured so as to permit a maximum of 8% straining of the wires 20 when the shape memory alloy is Nitinol. It was found that approximately 6% to 8% straining of the Nitinol wires 20 yielded the greatest recovery forces while still maintaining a fully recoverable strain. If full shape recovery after straining is not of concern, such as in the case of one-time utilization of the wires 20, larger deformations, such as 8% to 20%, may be utilized. If straining and full recovery of the shape memory alloy is desired, however, it is important that the straining not exceed approximately 6% to 8%. Straining beyond this limit will result in incomplete shape recovery of the shape memory alloy.

Maximum 8% straining of the wires 20 is accomplished by limiting the linear path of travel of the first piston 16 along the inside bore of the first hydraulic cylinder 12 by the use of piston stops 40,42 previously described. The piston stops 40,42 define the maximum amount of travel the first piston 16, and thereby the maximum length wire 20, can attain during the operation of the actuator 10. As shown in FIG. 1, the first piston 16 travel is limited to the linear path length $L_A$ which is set to be no greater than 8% of the length L, the length of wire 20 when in the austenitic state. The length of travel $L_A$ of the first piston 16 due to the change in state of the length of wire 20 is always less than the length of travel of the second piston 18 and, therefore, less than the linear path length $L_A$ of the output stroke of the actuator 10. In addition, the force imparted by the movement of the first piston 16 due to the change in state of the length of wire 20 is always greater than the actuator output force found at the second piston 18 or circular member 62.

The actuator of the present invention contains an electrical apparatus for passing an electric current through each of the alloy wires 20 so as to selectively heat the wires 20 along their lengths above the shape memory alloy transition temperature range (TTR). The electrical apparatus, as shown in FIGS. 1 and 2, contains an electric current source and connecting lines 26, 28, 30. Control of the electric current generated by the electric current source is provided by switch 24. In an alternate configuration, the electrical apparatus may contain extra switches and connecting lines, which may be used to individually control the heating of a number of alloy wires 20. This type of configuration would allow the actuator 10 of the present invention to have a controllable actuating force output, as each wire 20 individually contributes a discrete force to the total actuator output force of the actuator 10. In addition, a variable electric current source may be provided (not shown). The variable electric current source would allow the temperature, and therefore the force output of the wires 10, to be variable. Other electrical apparatus configurations are possible.

It should be noted that, although an electrical apparatus for passing an electric current through the wires 20 is shown, other means of selectively heating the wires 20 may be employed, such as convection, conduction, and radiant heating. For example, the wires 20 may be heated above the TTR by an increase in the temperature of the fluid 22 contained within the actuator 10.

The fluid 22 in the first hydraulic cylinder 12 may be either a liquid or a gas. Typically, a liquid such as standard commercial hydraulic fluid may be used, although other liquids may be employed. The liquid should be non-harmful to the surrounding cylinders and pistons and should not be detrimental to the functioning of the wires 20. Preferably, a noncompressible fluid is used.

A biasing means is utilized in the actuator 10 of the present invention and is disposed within the second hydraulic cylinder 14. In FIG. 1 and FIG. 2, the biasing means is shown as a common metal spring 60 about piston rod 48. As shown in FIG. 1, the spring 60 maintains the second piston 18 in a rest position when the wires 20 are not heated (the electric current source is disconnected from the wires 20 by switch 24) and the wires 20 are thus in the martensitic state. The spring 60 is selected to have a force that is able to be overcome by the movement of the second piston 18 in response to the change of the wires 20 to the austenitic state when heated (when the electric current source is connected to the wires 20 through switch 24). Other biasing means are possible using other materials or configurations. For example, the spring 60 may be eliminated from the actuator 10 when a load is placed on the load bearing surface 64 of circular member 62 that is able to exert a force on the second piston 18 sufficient enough to provide a biasing means.

The operation of the actuator 10 found in FIGS. 1 and 2 begins with the closing of the switch 24, thereby connecting the electric current source to the lines 28,30. This completes the electric circuit for passing an electric current through the wires 20. Since wires 20 have a high electrical resistance, the passing of the electric current therethrough causes heating above their TTR. As the wires 20 are heated above their TTR, the longitudinal dimension thereof decreases, thereby pulling the first piston 16 towards the threaded fasteners 52 in the top 44 of the first hydraulic cylinder 12. In this way, the first piston 16 moves from its first or unheated position, as seen in FIG. 1, to its second or heated position, as seen in FIG. 2.

The movement of the first piston 16 from its first position to its second position at piston stop 40 causes the fluid 22 to displace the second piston 18 from its rest position, as seen in FIG. 1, to its operating position, as seen in FIG. 2, within the second hydraulic cylinder 14. The circular member 62 and rod 48 are thereby extended in the actuated position when the second piston 18 is so moved into its full, operating position. The heat generated by the heating of the wires 20 by the electric current is dissipated into the fluid 22 and then into the surrounding first hydraulic cylinder 12. The cooling fins 38 help to dissipate this heat to the surrounding environment.

When switch 24 is then returned to the open position, the electric current source is disconnected from connecting lines 28,30, thereby interrupting the heating of the wires 20 which begin to cool, the cooling rate determined by the amount of heat dissipation by the fluid 22 and first hydraulic cylinder 12. When the wires 20 cool below their TTR, the shape memory alloy changes back to its martensitic state at which time the spring 60 has sufficient force to move the second piston 18 within the second hydraulic cylinder 14. The spring 60 returns the second piston 18 to its rest position. The movement of the second piston 18 from its operating position to its rest position displaces the fluid 22 back into the first hydraulic cylinder 12 and thereby moves the first piston 16 back to its first position. The travel of the first piston 16 is limited by the piston stops 40,42 as previously described.

Therefore, the actuator 10 of the present invention allows the high force and small movement output of the wires 20 in changing from the martensitic to the austenitic state to be converted to a lower force but larger movement output of the second piston 18. An efficient actuator 10 operation is thereby realized utilizing a shape memory alloy in conjunction with hydraulic force conversion.

A number of design parameters are considered in constructing the actuator 10 of the present invention. The second hydraulic cylinder 14 and second piston 18, being hydraulically connected to respond to the movement of the first piston 16, are preferably of smaller diameters than cylinder 12 and piston 16. The first cylinder 12 is a hydraulic cylinder with a high force-to-stroke ratio, while the second cylinder 14, being the response cylinder, is a smaller hydraulic cylinder with a smaller force-to-stroke ratio.

The bore sizes of the hydraulic cylinders could have been any one of a number of combinations, but, since compactness of actuator size was one of the desirable goals, it was determined to correlate the hydraulic cylinder diameters with the length of wires 20 and their associated contraction. Assuming that the pressure P is the uniform system hydraulic pressure, that fluid 22 is an incompressible hydraulic fluid, and that the maximum shape memory alloy elongation is 8%, the following equations can be derived:

The force $F_s$ exerted on the second piston 18 when the first piston 16 is moved by the change of state of Nitinol is given by:

$$F_B = PA_B \text{ or } P = F_B/A_B \qquad (1)$$

Where $A_B$ = the surface area of the second piston fluid contacting surface 54.

The force $F_A$ exerted on the first piston 16, due to the change of state of Nitinol is given by:

$$F_A = PA_A \qquad (2)$$

Where $A_A$ = the surface area of the first piston fluid contacting surface 56.

Now combining equations (1) and (2) to get:

$$F_A = F_B/A_B(A_A) \text{ or } F_A/F_B = A_A/A_B \qquad (3)$$

Assuming that the fluid volume $V_A$, of the first hydraulic cylinder 12 is the same as the fluid volume $V_B$ of the second hydraulic cylinder 14, we have:

$$V_A = V_B$$

$$L_A A_A = L_B A_B \text{ or } L_B/L_A = A_A/A_B \qquad (4)$$

Where $L_A = L_O - L$ and $L$ = the length of the wires 20 in the austenitic state.

$L_O$ = the length of the wires 20 in the martensitic state.

Assuming that the maximum elongation of the wires 20 is 8%, we have:

$$L_A = (0.08)L \qquad (5)$$

To keep the actuator 10 as compact as possible, the height $L_B$ of the output stroke of the second piston 18 (or attached circular member 62) is made to be near that of the wires 20.

Therefore, $$L_B = L \qquad (6)$$

Now combining equations (4), (5) and (6), we derive:

$$(0.08)LA_A = LA_B$$

or $$A_A/A_B = 12.5 \qquad (7)$$

Combining equations (7) and (3), we have:

$$F_A/F_B = 12.5 \qquad (8)$$

Therefore, the force and stroke ratios have been calculated as:

$$L_B/L_A = A_A/A_B = F_A/F_B = 12.5$$

Assuming that the surface areas $A_A$ and $A_B$ can be represented by:

$$A_A = \pi/4(D_A)^2$$

$$A_B = \pi/4(D_B)^2$$

Where $D_A$ = the diameter of the first hydraulic cylinder 12 bore.

$D_B$ = the diameter of the second hydraulic cylinder 14 bore.

The cylinder bore ratio can be derived as follows:

$$D_A/D_B = 3.54$$

Both the calculated cylinder fluid contacting surface area ratio ($A_A/A_B = 12.5$) and the cylinder bore ratio ($D_A/D_B = 3.54$) were utilized in constructing the actuator 10 of the present invention. Although many other combinations are possible, these ratios were chosen to design for the maximum compactness with a suitable force output of the actuator 10.

B. SECOND EMBODIMENT

Figure 3:
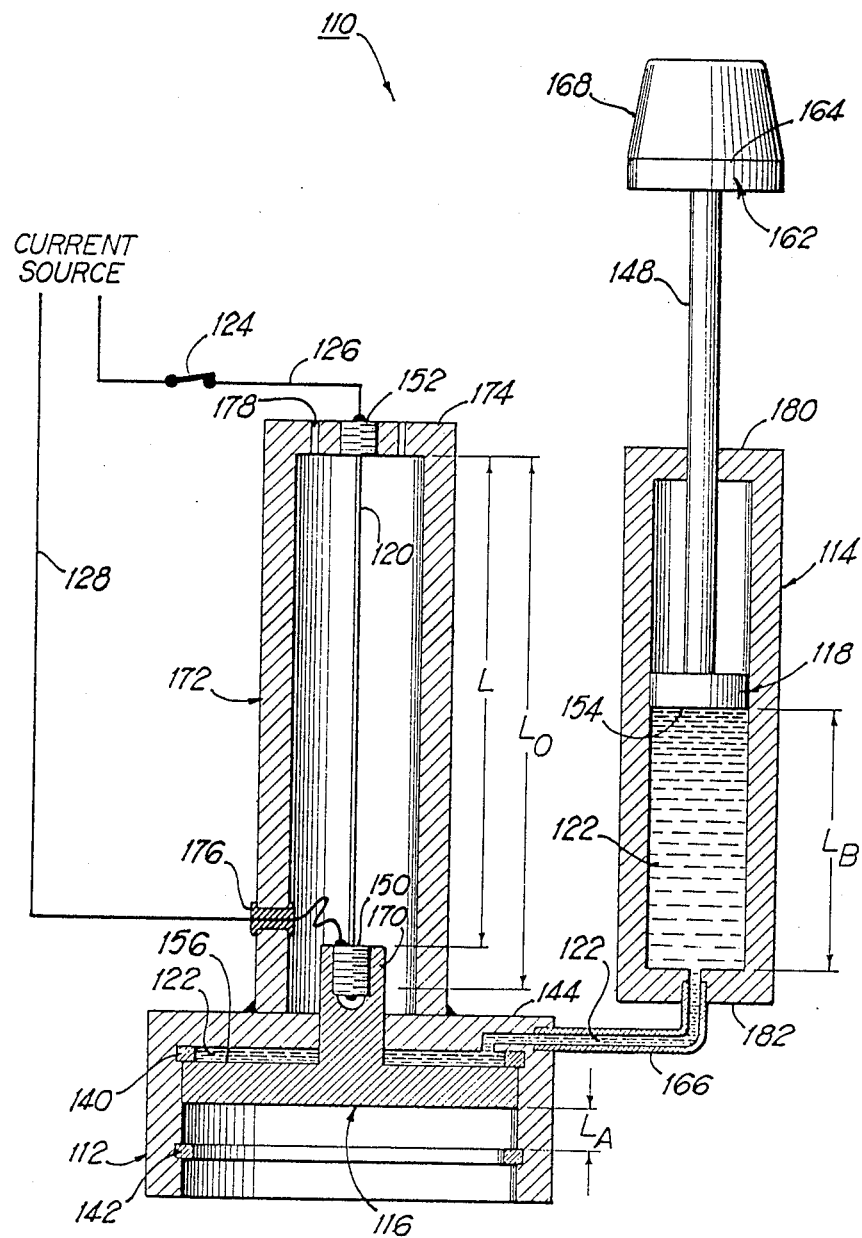
FIG. 3 is a cross-sectional view of an actuator according to an alternate embodiment of the present invention.

FIG. 3 shows the second embodiment 110 of the actuator 10 of the present invention in the actuated state with switch 124 closed. In this configuration the second hydraulic cylinder 114 and second piston 118 are physically separated from the first hydraulic cylinder 112 and first piston 116. This alternate configuration may be useful where a remote location for the second hydraulic cylinder 114 is desired. The movement of the pistons 116,118 within the cylinders 112,114 is communicated by means of a conduit 166 containing fluid 122. The fluid 122 is disposed between the first piston fluid contacting surface 156 and the second piston fluid contacting surface 154. The conduit 166 may comprise a hydraulic hose or similar means for connecting the fluid between the two cylinders 112,114. In this configuration, only one shape memory alloy wire 120 is shown, but a plurality of wires may also be utilized. FIG. 3 shows a load 168, comprising a weight, placed on the load bearing surface 164 of circular member 162 so as to provide a sufficient biasing means for the second piston 118. The load 168 is selected so as to return the second piston 118 to a rest position from an operating position when the wire 120 changes from its austenitic state back to its martensitic state. Other biasing means are possible, such as using a common metal spring to return the second piston to its rest position. The circular member 162 is connected to the second piston 118 by means of a piston rod 148.

As shown in FIG. 3, the first hydraulic cylinder 112 of the second embodiment has a top section 144 which has an opening therein through which a vertical extension 170 of the piston 116 passes. The extension 170 projects upwardly from the center of the first piston fluid contacting surface 156 and has a threaded fastener 150 located within it to provide a mechanical attachment point for the wire 120. The fastener 150 also provides an electrical connection for the wire 120 when connected to electrical line 128. As in the case of the threaded fasteners 50,52 shown in FIGS. 1 and 2, the threaded fastener 150 may be an electrically conductive or non-conductive material depending on the application. In FIG. 3, the fastener 150 is shown as a non-conductive material when the first piston 116 is made of an electrically conducting material, thereby allowing line 128 to contact the wire 120, but yet allowing the wire 120 to be electrically insulated from the extension 170.

The first hydraulic cylinder 112 has piston stops 140,142 similar in function to the piston stops 40,42 shown in FIGS. 1 and 2 to limit the travel of the first piston 116 in the bore of the first hydraulic cylinder 112. Extending from the first cylinder top 144 is an elongated circular support 172 which is utilized to position the wire 120 outside the first hydraulic cylinder 112 and thus, out of contact with the fluid 122 contained within the first hydraulic cylinder 112. A threaded fastener 152 extends through the support top 174 and is in opposed relationship to the fastener 150 for providing an upper mechanical attachment point for the wire 120. The fastener 152 provides a fixed point for the attachment of the wire 120. Other points fixed in position relative to the first cylinder 112 may also be utilized.

The threaded fastener 152 also provides an electrical connection for the wire 120 when connected to the electrical line 126. As in the preferred embodiment of FIGS. 1 and 2, the threaded fastener 152 may be an electrically conductive or non-conductive material depending on the application. In FIG. 3, the fastener 152 is shown as a non-conductive material when the support 172 is an electrically conductive material, thereby allowing line 126 to contact the top of wire 120 but still allowing the wire 120 to be electrically insulated from the support 172. The side wall of support 172 has an electrical insulator 176 extending therethrough, the line 128 passing through insulator 176. When the support 172 is an electrically non-conductive material, fastener 152 may be electrically conducting material.

The support 172 is made from any rigid material, such as metal or plastic, that will maintain the proper position of the wire 120 during operation of actuator 110. The top 174 of support 172, has a plurality of air channels 178 which allow for the escape of unwanted air trapped inside the chamber formed by the support 172 and the first cylinder top section 144 and also provide a way of venting warm air that has been heated by the wire 120. Alternately, cooling of the wire 120 may be accomplished through convection transfer by moving a heat-exchange medium, such as a cooling fluid, through the channels 178 and around the wire 120.

The second hydraulic cylinder 114 has a top 180 and a bottom 182 with top 180 having an opening through which the piston rod 148 passes. The dimensions of the opening are such that air may pass around the rod 148 when it moves through the opening. Alternatively, air channels may be placed in the top 180 to allow for the escape of unwanted air from inside the second hydraulic cylinder 114. The conduit 166 interconnects the interior of second cylinder 114 through its bottom 182 with the interior of the first cylinder 112 above piston 116. A load 168 is shown resting on the load bearing surface 164 of circular member 162. The load 168 will also act as a biasing means for the second piston 118, as previously described.

The actuator 110 operates in a similar manner as the previously described actuator 10. Upon heating of the wire 120 above its TTR and the resultant rise of the piston 116 to its operative position as seen in FIG. 3, the fluid 122 in cylinder 112 is forced out through conduit 166 into cylinder 114, whereupon the fluid 122 therein acts upon piston surface 154 to force piston 118 upwardly, causing the load 168 to rise. Cooling of the wire 120 below its TTR reverses the movement of the associated elements of actuator 110.

What is claimed is:

1. A hydraulic shape memory alloy actuator, comprising:
    (a) a first cylinder having fluid therein;
    (b) a first piston capable of movement between first and second positions within said first cylinder, said first piston having a fluid contacting surface;
    (c) a length of shape memory alloy having a first end connected to said first piston and a second end connected to a fixed point, said alloy capable of changing from a martensitic state to an austenitic state when said alloy is heated above a transition temperature range so as to move said first piston from said first position to said second position, said alloy also capable of changing back to said martensitic state from said austenitic state when said alloy is cooled below said transition temperature range whereby said first piston moves from said second position to said first position, said length of said alloy having a shorter longitudinal dimension in said austenitic state than in said martensitic state;

(d) a second cylinder, said first and second cylinder being in fluid communication with each other;

(e) a second piston capable of movement between a rest and an operating position within said second cylinder, said second piston having a fluid contacting surface, said second piston having said fluid dispersed between it and said first piston, said fluid contacting said fluid contacting surface of said first piston and said fluid contacting surface of said second piston, said fluid communicating the movement of said first piston to said second piston when said first piston moves between said first and second positions, said fluid also communicating the movement of said second piston to said first piston when said alloy changes from said austenitic state to said martensitic state;

(f) biasing means capable of moving said second piston from said operating position to said rest position as said alloy changes from said austenitic state to martensitic state; and (g) means for selectively heating said length of shape memory alloy above said transition temperature range.

2. The actuator of claim 1, wherein said second cylinder is coaxially mounted within said first cylinder, said fluid contacting surface of said first piston in opposing relationship to said fluid contacting surface of said second piston.

3. The actuator of claim 2, including at least two of said lengths of shape memory alloy, said fixed point of each of said lengths being disposed within said first cylinder, said lengths being in diametrically opposed relationship around said first cylinder along the longitudinal axes of said cylinders.

4. The actuator of claim 1, wherein said means for selectively heating said length of shape memory alloy comprises an electrical apparatus for passing an electric current through said alloy.

5. The actuator of claim 1, and further comprising a piston rod and a member, said piston rod attached at a first end to said second piston and at a second end to said member, said member capable of bearing a load thereon.

6. The actuator of claim 1, wherein said biasing means comprises a spring.

7. The actuator of claim 5, wherein said biasing means comprises a load placed on said member.

8. The actuator of claim 1, wherein said second cylinder is external of said first cylinder and further comprising a fluid conduit intercommunicating the interiors of said first and second cylinders, whereby said fluid communicates said movements of said pistons to each other through said conduit.

9. The actuator of claim 1, wherein said fixed point is located within said first cylinder opposite said first piston.

10. The actuator of claim 1, wherein said fixed point is located external to said first cylinder.

11. The actuator of claim 1, wherein said movement of said second piston defines a linear path length greater than the length of the linear path defined by said movement of said first piston.

12. The actuator of claim 1, wherein the surface area of said first piston fluid contacting surface is greater than the surface area of said second piston fluid contacting surface.

13. The actuator of claim 1, and further comprising cooling means for said alloy to shorten the time required for said alloy to change from said austenitic state to said martensitic state.

14. The actuator of claim 13, wherein said cooling means comprise cooling fins attached to said first cylinder.

15. The actuator of claim 13, wherein said cooling means comprises a thermoelectric heat exchange unit on said first cylinder.

16. The actuator of claim 1, and further comprising a means for preventing fluid pressure overload in said first cylinder.

17. The actuator of claim 16, wherein said preventing means comprises a fluid accumulator.

18. The actuator of claim 1, wherein said first piston is a rigid piston.

19. The actuator of claim 1, wherein said second piston is a rigid piston.

20. The actuator of claim 1, wherein said first piston is an elastometric diaphragm.

21. The actuator of claim 1, wherein said first piston is a metal bellows.

22. The actuator of claim 1, wherein said second piston is an expandable bladder.

23. The actuator of claim 1, wherein said shape memory alloy is a nickel-titanium alloy.

24. The actuator of claim 1, wherein said shape memory alloy has a linear shape.

25. The actuator of claim 1, wherein said shape memory alloy has a coil shape.

26. The actuator of claim 1, wherein said fluid is a liquid.

27. The actuator of claim 1, wherein said fluid is a gas.

* * * * *

UNITED STATES PATENT AND TRADEMARK OFFICE
CERTIFICATE OF CORRECTION

PATENT NO. : 4,945,727

DATED : August 7, 1990

INVENTOR(S) : Charles A. Whitehead et al.

It is certified that error appears in the above—identified patent and that said Letters Patent is hereby corrected as shown below:

On the Front Page, first column, line 7, the zip code for the first named inventor should be changed from "36330" to --35223--.

Signed and Sealed this

Twentieth Day of August, 1991

Attest:

HARRY F. MANBECK, JR.

*Attesting Officer*      *Commissioner of Patents and Trademarks*